April 9, 1963 C. H. JENKINS 3,084,603
UNIVERSALLY TILTABLE MACHINE TOOL HEAD FOR COMPOUND CONTOURING
Filed April 23, 1959 7 Sheets-Sheet 1

INVENTOR.
CARLTON H. JENKINS
BY
ATTORNEY

Fig. 4.

April 9, 1963 C. H. JENKINS 3,084,603
UNIVERSALLY TILTABLE MACHINE TOOL HEAD FOR COMPOUND CONTOURING
Filed April 23, 1959 7 Sheets-Sheet 5

INVENTOR.
CARLTON H. JENKINS
BY
ATTORNEY

Fig. 8

INVENTOR.
CARLTON H. JENKINS
BY Julian C. Renfro
ATTORNEY

Fig. 9

INVENTOR.
CARLTON H. JENKINS
BY Julian C. Renfro
ATTORNEY.

United States Patent Office 3,084,603
Patented Apr. 9, 1963

3,084,603
UNIVERSALLY TILTABLE MACHINE TOOL HEAD
FOR COMPOUND CONTOURING
Carlton H. Jenkins, Baltimore, Md., assignor to Martin-Marietta Corporation, a corporation of Maryland
Filed Apr. 23, 1959, Ser. No. 808,364
15 Claims. (Cl. 90—13)

This invention relates to a machine for the contouring of material, such as honeycomb core, and more particularly, to an improved head arrangement for a pattern controlled machine, such as a milling machine or the like, adapted to the production of compound contours hitherto unobtainable on lightweight material.

In the past, machine tools have been in widespread use in industry, the use of which made it possible to manufacture a practically unlimited variety of machined parts. Tapering, swarfing, grooving, undercutting and a number of other operations have been successfully performed. However, in each known instance, milling machines having tiltable heads that will enable unusual cuts to be taken, have suffered from the distinct limitation that compound contours cannot effectively be cut. The limitation of prior art cutting techniques becomes pronounced when attempts are made to compound cut such lightweight structural material as honeycomb core, even when the honeycomb core is made of stainless steel foil, which is a material offering a relatively rigid structure. This is because prior art cutting arrangements have not taken into consideration the fact that the cutter must address itself in a particular relationship with the core if the cut is to be made properly. This is to say, if prior art cutters are used to compound contour honeycomb core, they tend to tear it, to cause the foil to be deformed, to lay it over at the wrong angle and to cause other difficulties, such as gouging. For this multipilicity of reasons honeycomb core has been extremely difficult to work with when compound contours are to be cut therein. Therefore, a close fit between core and skin to be bonded or brazed thereto is often prevented, with resulting limitations from the strength and utility standpoints.

Various attempts have been made to rigidize honeycomb core so as to make possible the cutting of the care to precise dimensions through several avial contours, such as by filling the cells with a compound that can be removed after the machining operation. Other attempts have included electrolytic machining, as well as the employment of sanding operations subsequent to conventional machining so as to obtain desired contours, but none of these has proven completely successful.

According to the present invention, a unique tracer-cutter combination is provided for the accurate, yet rapid production of highly contoured items of low density material, such as of honeycomb core. The self-powered cutting head of the head unit is universally movable by virtue of it being supported from a pair of arcuately movable head members mounted for movement in planes disposed substantially orthogonally to each other, these members being movable, however, about a common focal point centered at the tool rotatably mounted in the head. The tracer unit utilizes a plurality of motion sensitive devices for accurately supplying information as to the contours of a pattern being followed, which information is employed for controlling the contouring mevements of the head. The tracer unit may advantageously employ a plurality of relatively movable styli for following the contours of the pattern, thereby to establish the path angle and extent of travel for the cutter held in the cutting head. The respective motions of the styli are converted into command signals, such as by the use of servomechanisms, so that the cutting head will be caused to move so as to contour cut a workpiece identically to the contours of a pattern in a highly effective manner, regardless of the direction and complexity of the contour involved. Mounted on the head is a compound angle compensator which compensates for the compound angles involved in cutting a contoured workpiece.

The directions in which the head may be swiveled may be regarded as fore and aft, and left and right, with the axial centerline of the cutter always remaining in essentially the same cone of revolution, the apex being the aforementioned focal point on the cutter, and always bearing an exact relation with the styli used to determine its movements. Because of this, the cutter will always address the work to be cut at an angle that will agree precisely with the cut to be taken, thereby preventing any tearing or gouging of the material being cut.

According to a preferred embodiment, the cutter head and tracer unit are mounted in spaced relation, and arranged to simultaneously contact a similarly spaced workpiece to be operated upon, and a pattern for establishing the contour to be duplicated on the workpiece, respectively. The cutter head and tracer unit can be movable with respect to the workpiece and pattern, or alternatively, the head and tracer unit can be fixed with relative motion for contouring operations supplied by having the workpiece and pattern mounted for example upon the movable table of a machine. This manner of movement of the material is highly adaptable to the use of a toothless, friction type cutter disc that will easily cut honeycomb core, and not leave any ridges therein necessitating a finishing operation.

The tracer unit utilized according to this invention may advantageously employ two pairs of stylus pickups, one pair associated with fore and aft movement of the head, and the other pair associated with left and right movement, and each pair designed to actuate a respective motion sensitive device, such as a transducer. These transducers initiate electrical signals, which are fed into an amplifier, with the amplifier then increasing the strength of the electrical signals to a point where these signals can effectively control the operation of the servomechanism devices. Latter devices control the flow of hydraulic fluid to separate actuating devices such as a piston for fore and aft head movement, and a piston for left and right movement, which impart arcuate motions to the milling head. In this manner, the movements of the contour-sensing styli impart the contour of the master pattern to the cutting head, so that the head may address the workpiece at the precisely correct angle and in the appropriate manner, in accordance with the master profile.

The compound contouring arrangement according to this invention is extremely versatile, for machine tools may be manufactured to utilize this concept, or alternatively, contemporary milling machines can easily be adapted to utilize this invention without major reconstruction of the machine being involved. As a matter of fact, one particular embodiment of this invention envisions a portable head arrangement that is entirely self-contained, and which has a spindle on the uppermost part thereof adapted to be received into the chuck of a milling machine. The spindle of the milling machine is not rotated, but rather is held fast so as to firmly support the head in a desirable manner. The motor contained in the portable head is arranged to drive the cutter saw in rotation, and inasmuch as this motor can be driven by compressed air, electricity, or hydraulic fluid, the necessity of the usage of the components of the parent milling machine are limited to left-right movements of the table, fore-aft movement of the overhead carriage, and rise-fall of the tracer and head.

It has not hitherto been possible in pattern controlled machine tools to make adjustments and compensations for the inherent differences in the cutting of male and female contours, or a combination of both. This invention provides pneumatic loading of the styli of the tracer unit when cutting convex contours, which insures that the proper styli will always remain in contact with the pattern so that an accurate reproduction of the contour is obtained. When cutting convex contours, three styli are always in contact with the pattern, one fixed stylus, and two movable styli, with the diametrically placed stylus pair members of the movable styli not touching the pattern. When cutting concave contours, the stylus in the center of the tracer mechanism is never in contact with the pattern whereas the four styli constituting the two stylus pairs are always in contact with the pattern. When encountering a combination of convex and concave contours, the aforementioned pneumatic loading apparatus need not be manually turned on and off, for when the contour changes from concave to convex, the proper styli are automatically maintained in the proper position in relation to the master pattern.

Other objects, features and advantages of this invention will be apparent from a study of the written description and the appended drawings in which—

*General Details*

Figure 1:
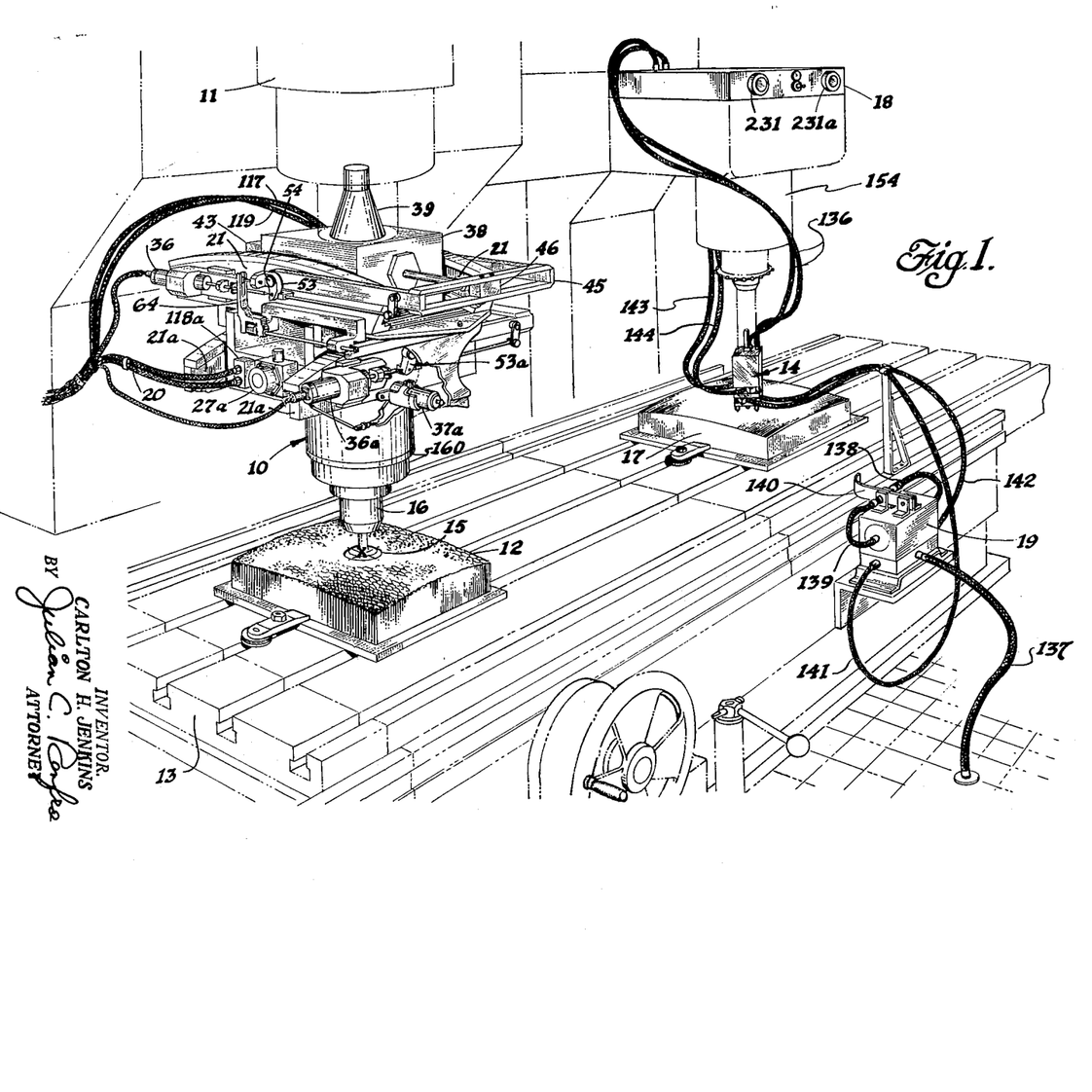
FIGURE 1 is a perspective view of a typical contouring head and tracer arrangement according to this invention, in operative position.

In FIGURE 1, a movable compound contour head 10 is revealed mounted on a milling machine 11 and arranged to perform contouring operation upon a billet of honeycomb core 12 or the like that is mounted upon longitudinally movable table 13 of the machine. This entire head unit 10 may be in the nature of an auxiliary unit that can be operatively received in any of a number of machine tools, which is indicative of the fact that this invention is not to be limited to use in any particular environment. Head 10 may be equipped with a cutting unit such as a disc cutter 15 that is adapted to be driven in rotation by a motor 16 or the like forming an integral part of head unit 10 and movable therewith during its contouring movements. Motor 16 may be an air motor, a hydraulic motor, or an electric motor, as may be preferred. According to one exemplary arrangement, however, motor 16 was a 12,000 r.p.m. compressed air driven motor, which quite adequately provided power to a friction disc cutter of 2 inch diameter, made of high speed steel or carbide.

According to the preferred design, the head 10 is tiltable in both the fore and aft direction and the left and right direction while maintaining the central portion of the tool 15 at a fixed point, hereinafter referred to as point X. Fore-aft contouring movements of the head are brought about by upper arcuate member 21, which moves fore or aft about an arcuate path having point X as a focal point. Lower arcuate member 21a, disposed 90° away from member 21 makes possible left and right arcuate head movements. As will be seen in greater detail hereinafter, by virtue of this arrangement to permit motion in orthogonally disposed planes, the head can be displaced either in the fore and aft direction or the right and left direction, or in a combination of directions simultaneously, to tilt cutter 15 about its focus point so that it will address the work in the proper manner, i.e., so as to insure accuracy, and prevent tearing or gouging of the workpiece. A tilt of each head member to the extent of 10° to 15° on each side of the vertical is usually sufficient for most contouring operations. If, however, more angularity is needed, an auxiliary trunnion may be employed on the table of the machine to tilt the pattern and workpiece simultaneously.

Movements of the head, so that the contouring movements can be carried out, are controlled according to this invention by a stylus mechanism or unit 14 mounted on machine 11 in substantial alignment with head 10 but spaced therefrom. Stylus mechanism 14 is typically received the tracer unit 154 associated with the rise and fall mechanism of machine 11. A plurality of movable styli are slidably mounted in substantially parallel relation in housing 32 of stylus mechanism 14, and these styli have active lower surfaces thereon which are adapted to closely follow the contours of a master pattern 17 mounted on bed 13 in alignment with workpiece 12. Note details of this device in FIGURES 4 and 8. Pattern 17 may be of plastic, plaster, wood or metal, for example, and preferably of slightly larger overall dimensions than the workpiece to prevent the styli from running off the edge of the pattern. Through a suitable electrical interconnection, the movement of said styli result in movement of head 10 so as to bring about contouring of workpiece 12 into the exact configuration of pattern 17. The construction and operation of tracer mechanism 14 is an important facet of this invention, and will be considered in detail hereinafter.

As will be clear to those skilled in this art, the head unit 10 and the stylus unit 14 may be adapted to be readily received in any of a number of commercially available milling machines, without any substantial modification of such machines being necessary in order that the contouring movements of the instant head may be carried out. For example, the Cincinnati Milling Machine Company of Cincinnati, Ohio manufactures a number of tracer controlled milling machines under the trade name "Hydro-Tel," which are equipped with a tracer unit adapted to guide the vertical movements of the cutter of the machine in conformance with the contours of a pattern. This invention has been successfully employed on a 28″ x 60″ Hydro-Tel, as well as on a 48″ x 168″ machine of this type. The tracer unit of such a machine is automatic in its operation, and its stylus exerts but a few ounces of pressure on the pattern so that its contours can effectively be followed. Any small displacement of the tracer stylus will activate the hydraulic system of the machine to govern rise and fall of the cutter head. That is to say, if the pattern dictates an upward movement of the tracer assembly, the hydraulic system of the machine automatically brings about a commensurate movement of the cutter of the machine upward. As to fore and aft movements, so that the cutter can perform progressive cuts across the workpiece, such is provided in the parent machine by the use of a movable ram that supports the spindle, so that the cutter can be moved along the forward edge of the table as well as along the rearward edge. Alternatively, the table may be capable of fore and aft movement. Although left to right movement is usually provided by longitudinal table movement, it is entirely within the scope of intended use of this invention to install the head in a gantry movable over a fixed table. Other companies that manufacture tracer controlled machine tools such as the Kearney and Trecker Company of Milwaukee, Wisconsin, who manufacture a horizontal boring mill, and the Morey Milling Machine Co. of New York, New York who market several models of machines having rise and fall features.

Each of the known prior art pattern controlled milling machines have a number of distinct limitations, such as, for example, they cannot perform contouring of honeycomb core without the tearing of same, for the cutter of such a machine always rotates about a vertical axis, which means that the cutter cannot address the workpiece at the proper angle for the contouring of same. Also, if contouring a dome shaped aluminum casting, for example, a round nose cutter must be employed in order that an accurate contour may be created, because a square end mill would create a series of grooves on the workpiece. The result of using a round nosed cutter, however, is to create a number of small peaked ridges encircling the workpiece, which must be removed by other means, for a round-nosed end mill simply cannot finish cut a convex contour.

The directive device employed by the present invention makes unnecessary the rework of the workpiece to eliminate these ridges, necessary in prior art arrangements, for a flat-nosed end mill may be used to contour the workpiece, which results in accurate contours being cut from the inception of the operation. The use of the square-nosed end mill is of course possible in the present device because the directive unit brings about a tilt of the head 10 and cutting tool 15 into a plane parallel to the part of the pattern being followed at any one moment.

*Details of Head*

Figure 2:
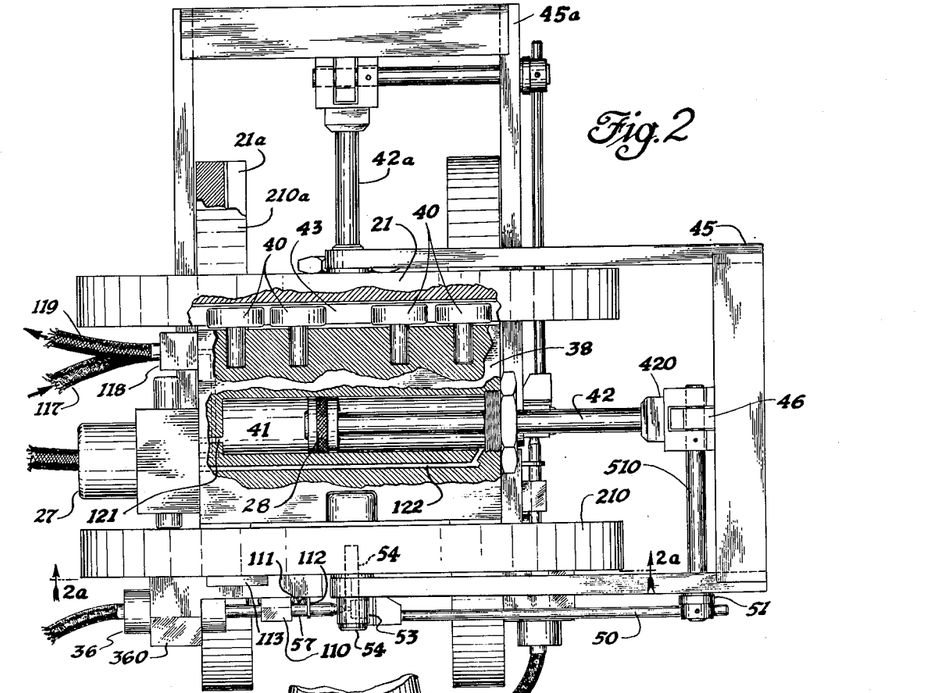
FIGURE 2 is a plan view of the upper portion of the head unit, with portions broken away to reveal internal construction.

As previously indicated, head 10 is adapted to be received in the spindle of any of a number of machine tools presently on the market, and to that end a mounting shank 39 is provided at the top of the head 10 which may be received in the chuck of the parent machine. The spindle of the machine thereafter remains stationary except for rise and fall, for the cutting and contouring movements of the cutter are thereafter provided by head 10. Shank 39, which may be a #50 standard mill taper, is rigidly attached to upper cylinder housing 38 so as to hold it firmly in relation to the ram of the machine. Cylinder 41 is formed in upper cylinder housing 38, as best seen in FIGURE 2, and in this cylinder, piston 28 is slideably movable in sealed relation, so as a result of the application of high-pressure fluid to cylinder 41 by operation of servo valve 27, piston 28 is caused to move piston rod 42 in either the fore or aft direction. The details of operation of valve 77 will be discussed hereinafter.

Figure 2A:
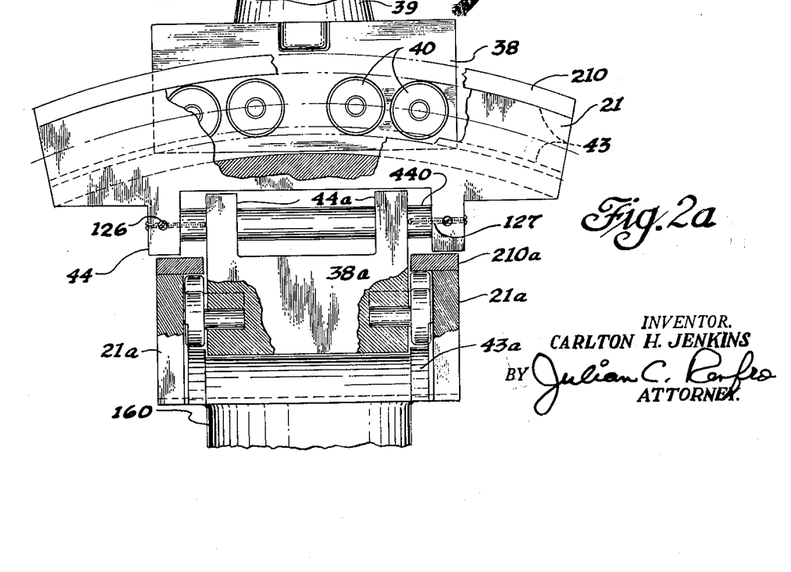
FIGURE 2a is a view taken in the direction of the dark arrows of FIGURE 2 to reveal construction of the arcuately movable members of the head.

Piston rod 42 is pivotally attached by hinge 46 to upper yoke assembly 45, which moves forward or aft with respect to upper cylinder housing 38 as dictated by movements of piston 28. The ends of upper yoke assembly 45 remote from hinge 46 are pivotally attached such as by pins 54 to upper arcuate member 21 so as to cause controlled arcuate movements of member 21 with respect to upper cylinder housing 38, in the fore and aft direction. As best seen in FIGURES 2 and 2a, a number of ball bearings 40 in the general nature of small precision wheels are disposed along an arcuate line on housing 38, at spaced points substantially equidistant from point X of cutter 15, illustrated in FIGURE 1. Suitable tracks 43 are provided on the inner surfaces of member 21, in which tracks the bearings 40 are adapted to roll. As should therefore be obvious, as movements of piston 28 are brought about by the selective porting of high-pressure fluid to cylinder 41 of cylinder housing 38, piston rod 42 is caused to move upper yoke assembly 45 and thereby convert the fore and aft lateral or translatory movement of the piston into fore and aft arcuate movement of member 21.

Actually, on each side of upper cylinder housing 38, two bearings of each group of four bearings 40 are arranged to take downward thrust and the other two are arranged to take upward thrust, this being accomplished by stepping or offsetting the rotative axis of the bearings above or below the true arcuate path. In the present instance, the outermost bearings 40 were set approximately .010″ above the true arcuate path, so as to contact only the upper surface of bearing track 43 whereas the two inner bearings were set say .010″ below the true arcuate path so as to contact only the lower surface of the bearing tracks. Since, therefore, the outer bearings actually clear the bottom of the tracks by .020″ and the inner bearings clear the top of the tracks by the same amount, the outer and inner bearings actually rotate in opposite directions as member 21 is moved with respect to housing 38 to cause fore or aft inclination of the head.

The member 21 is preferably one piece construction, generally U-shaped in cross section, with the channels 43 machined in the inner sides of the arms of the U. Bearing caps 210 are secured on each side of member 21 to complete the bearing track, and are secured in place such as by machine screws.

As best seen in FIGURE 2a, the underside of member 21 has a pair of spaced tongues or mounting bosses 44 thereon, having formed therein two pair of aligned holes arranged to receive a pair of spaced pins or shafts 440 therein. These pins 440 are secured in bosses 44 such as by set screws 126, and these pins form the support for lower cylinder housing 38a. To that end, a pair of spaced tongues 44a are provided on the upper surface of housing 38a, in which tongues, holes are provided through which extend the pins 440.

As will be noted, the tongues 44a are spaced apart sufficient to allow for movement of lower cylinder housing 38a along pins 440, which is a feature of this invention that is important when the head is being adapted for swarfing operations. A pair of elongated set screws 127 are threaded into each side of tongues 44 of member 21, equidistant from pins 440, and these are of such a length as to bear against tongues 44a of 38a, and thus prevent undesired motion of lower housing 38a along pins 440. By loosening one set screw and tightening the other, housing 38a can be moved in virtually a micrometer fashion to a new location. An example of an occasion for so moving 38a would be for swarfing operations, in which an end mill is being employed in the head. In such an instance, it is not the center point of the end of the end mill, but rather the intersection of a side and the end of the end mill that represents the point about which the head pivots. In other words, point X, the pivot point, is moved a distance corresponding to one-half the diameter of the end mill so that the head can be pivoted with respect to the outside lower corner of the milling cutter.

As shown in FIGURE 2a, member 21a, like member 21, is of U-shaped cross section, but mounted 90° away from 21 so as to move in a plane orthogonal to the plane in which member 21 moves. Although the members 21 and 21a are quite similar in function, the arcuate tracks 43a in the sides of 21a must be cut about a smaller arc in order to have point X common to both 21a and 21. Member 21a is caused to move right and left with respect to housing 38a by a piston arrangement (not shown) that is virtually identical to the piston of 38. As in the case of the fore and aft arrangement, the piston operative in lower housing 38a is connected by a piston rod 42a to lower yoke 45a to cause it to move, and thereby bring about motion of arcuate member 21a in the right and left directions, thereby to control tilt of the head.

On the lower surface of member 21a is motor housing support 160, as seen in FIGURE 1. Into this support, motor 16 is secured, such as by threading, although any other suitable mounting arrangement may be employed if desired.

*Feedback Linkage to Fore and Aft Feedback Transducer*

Referring to FIGURE 2, fitting 420 is affixed to the end of piston rod 42, which fitting forms a part of hinge 46. Into fitting 420, shaft 510 is pinned, so as to be non-rotative therein. The other end of shaft 510 passes through an appropriate hole in yoke 45, and has a link 51 non-rotatively fixed to the outer end thereof. Therefore, since piston rod 42 always moves in one plane, usually substantially horizontal, link 51 is always maintained perpendicular thereto.

Figures 3, 3A:
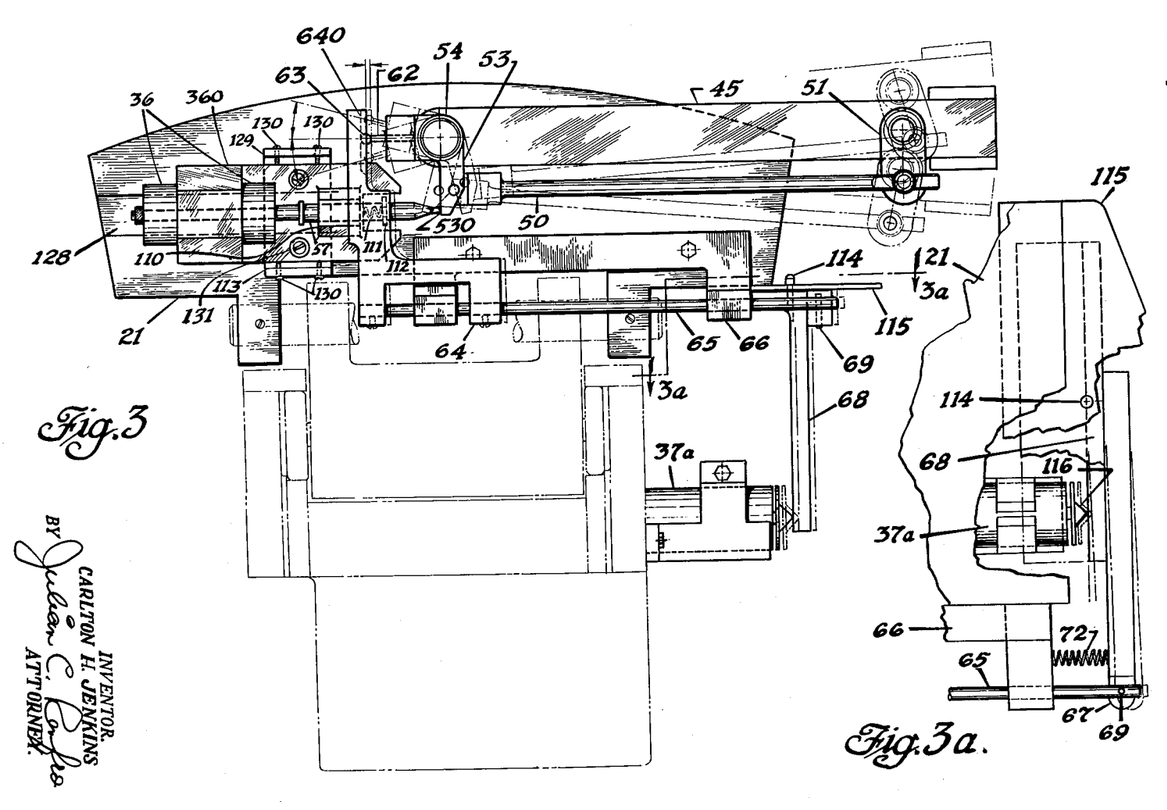
FIGURE 3 is an enlarged view taken with the upper arcuate member of the head assumed in fixed position to reveal and emphasize operation of certain transducer linkages.
FIGURE 3a is a fragmentary plan view of a forward portion of the transducer and angle plate arrangement associated with compound angle compensation.

As also to be seen in FIGURE 3, to the lower end of link 51, a push rod 50 is secured for the purpose of conveying motion to dog 53 so that the active surface 530 of dog 53 will remain essentially vertical through fore and aft movements of the head. As will be noted, dog 53 is pivotally supported by pin 54 that, as previously mentioned, secures the yoke 45 to member 21. Push rod 50 is pivotally attached to link 51 and dog 53, for inasmuch as the pivotal axis of dog 53 moves in an arcuate path as the head is moved for or aft, it is necessary that some rotary motion between push rod 50 and link 51 take place. However, the connection between 50 and 51 desirably does not allow sliding of push rod 50 in link 51.

The amount of fore or aft arcuate movement of member 21 is to be conveyed to the movable core of transducer 36 to furnish feedback information, which arcuate movement is accurately indicated by the position of surface 530 of dog 53. Transducer 36 is disposed in transducer holder 360, on the side of which boss 110 is disposed. Shaft 57, arranged to actuate the core of transducer 36, is slidably disposed in a hole through boss 110, which shaft is biased into contact with active surface 530 of dog 53 by compression spring 111 so as to mechanically convey to transducer 36 an indication of the arcuate fore and aft movements of the head, as represented by the position of dog 53. Bias spring 111 may be received in a suitable hole drilled in transducer holder 360 generally parallel to shaft 57, so a portion of its length is not visible. The force of spring 111 is conveyed to shaft 57 by virtue of a small thrust plate 112 that clips to shaft 57 at the location of an undercut. This undercut on shaft 57 forms a positive stop against movement of the thrust plate on shaft 57, so that spring 111 can be effective at all times to bias shaft 57 into contact with active surface 530 of dog 53.

Transducer holder 360 is adjustably secured in a fixed position on member 21 by virtue of adjustable bracket 113, having upper and lower edges 129. This bracket has a flat, rectangular-shaped projection or tongue (not shown) on its rear surface in contact with member 21, which tongue is movable along slot 128 to provide stability, and by virtue of set screws 130 located in 129, the position of transducer holder 360 in bracket 113 may be adjusted. Screws 131, which pass through holes 360 and 113, are threaded into tapped holes in member 21 and serve to hold 360 and 113 in desired position. During the set up of the machine, bracket 113 is adjusted so that shaft 57 contacts active surface 530 of dog 53 approximately the distance below the center line pivot pin 54 as the distance that center stylus pin 26 bears from each movable stylus of the tracer mechanism 14. (This distance also represents the radius of the cutter 15.) The transducer 36 is adjusted in bracket 113 so that the core may be moved in either side of a center position as the dog 53 reflects arcuate motion of the head. Typically, the core of transducer 36 is in its center position when the head is vertical.

*Compound Angle Compensating Mechanism*

Dog 53 serves another important function in that it contains a screw 62 having a rounded head 63 thereon, arranged to be moved in a channel 640 on bracket 64. Therefore, as dog 53 rotates about pin 54, screw 62 is caused to move from the full line position shown in FIGURE 3, wherein it is substantially perpendicular to groove 640 of bracket 64, into a position either above or below, as indicated in dotted lines. The motion of screw 62 permits bracket 64 to move (under the bias of spring 72) toward dog 53 to take up the "slack" thus created, which motion represents compound angle correction that must be taken into consideration by the head. Compression spring 72 is visible in FIGURE 3a. In a manner now to be described, this motion of bracket 64 is to be conveyed, via transducer 37a to affect the right and left motion of the head.

FIGURE 3 illustrates in substantial detail the compound angle compensating mechanism, and it should be noted that certain assumptions were made in the creation of this view, for the purpose of clarification. In this figure, arcuate member 21 is assumed in a fixed horizontal position at all times, with yoke 45 pivoted thereabout between the full line position shown in FIGURE 3, and the dotted line positions shown above and below the full line position. Actually, the converse is true, for the end of yoke 45 to which the piston rod 42 is secured is maintained in a substantially horizontal plane at all times, with the pinned end of member 45 adapted to travel in an arcuate path as movement of member 21 is brought about, but to illustrate the true relationship of such movements is to make more difficult the explanation of the compound angle compensating mechanism.

Bracket 66 forms the support for a considerable amount of the linkage associated with the compound angle contouring mechanism of this device, and this bracket is secured such as by machine screws to the outer side of member 21 as best seen in FIGURE 3. Bracket 66 has a pair of bosses having aligned holes therein, in which holes shaft 65 is linearly movable. One end of shaft 65 forms the support for bracket 64, and set screws in bracket 64 form convenient means for securing it to shaft 65.

The comparatively small motions of bracket 64 illustrated in FIGURE 3 are conveyed by shaft 65 to angle plate 68, so as to cause plate 68 to pivot about its support, which is vertical pivot axis 114, as best seen in FIGURE 3a. Mounting plate 115 on the forward portion of member 21 serves as the support for angle plate 68, allowing it to pivot at the behest of the movements of shaft 65. Shaft 65 is pivotally secured such as by pin 69 to an arm 67 secured to angle plate 68, which serves as the plate deflecting mechanism. Spring 72 is interposed between the forward edge of bracket 66 and the inner surface of arm 67, thus serving not only to eliminate any play in the linkage, but also to cause the groove 640 of bracket 64 to fit closely against rounded end 63 of screw 62 at all times. As should therefore be noted, whether head 10 tilts forward or aft from the vertical position, the angle plate is moved in a counterclockwise direction, as viewed in FIGURE 3a. Movements of said head from a tilted position to the vertical of course moves plate 68 in the clockwise direction back to the non-deflected position.

Transducer 37a is mounted on the outer front surface of lower arcuate member 21a, as seen in FIGURES 1, 3 and 3a, and as the head tilts either right or left from the vertical position, transducer 37a is physically moved away from the centered position in which the contact point 116 of the transducer core is aligned with vertical pivot axis 114 of angle plate 68. Angle plate 68 has a smooth inner surface across which contact point 116 may travel as the head tilts from side to side, so as to sense the degree of deflection of plate 68. As shown in FIGURE 3a, when head 10 has been deflected to the far left (as viewed from FIGURE 1), transducer 37a is caused to be disposed at the left end of angle plate 68, which is a position in which maximum deflection of the transducer core occurs. Transducer 37a is electrically wired in series with the other transducers associated with the left-right movement of the head, and, more particularly, the secondary of transducer 37a is wired in series with transducer 36a to cause additional travel of member 21a along its arcuate path in proportion to the amount the upper arcuate member is divergent from the centered position, which is of course represented by the degree of deflection of plate 68. As an example of the operation of this facet of this invention, when transducer 37a has been moved to the left into the position illustrated in FIGURE 3a, its core has moved outwardly with respect to its windings, and this results in additional movement of the head to the left, to compensate for the error in the angle of the cutter that would otherwise be present due to compounding of angles. When transducer 37a has been positioned, by the centering of the lower (left-right) portion of the head, to the point on member 68 aligned with pivot 114, no compensating signal is sent, for none is necessary. However, when the head is moved to the right, this places transducer 37a at the opposite extreme position on angle member 68, which causes an inward movement of its core. This causes an overrun of the head to the right, to compensate for the compounding of the angle in the right-hand direction. In one exemplary embodiment, only .014" movement of the core of transducer 37a was involved as the head was moved, representing .007" inward movement and .007" outward movement away from a central position.

A graphical illustration will perhaps indicate the occasion for compound angle compensation. Consider a pole vertically disposed upon a flat plane, with a cross arm on the pole, at right angles thereto, and parallel to the flat plane. Corresponding to the tilt of the cutter axis in, say, the fore-and-aft direction, the pole is now tilted with respect to the plane. Assume now the cross arm to be turned 30° with respect to the pole, about their intersection point. Had the pole remained vertical, the cross arm would have been disposed at a 30° angle with respect to the reference plane, but because of the tilt of the pole, and therefore the compounding of angles, this will not be the case. Therefore, in order to dispose the cross arm at a 30° angle with respect to the plane, a compensation must be made with regard to the angle the cross arm makes with the pole. This, therefore, is the occasion for compound angle compensation, and the overrun provided by transducer 37a.

Movement of Head 10

Referring back to FIGURE 2, servo valve 27 is illustrated, which is responsible for bringing about selective movements of head 10 in the fore-aft direction. Servo valve 27 is arranged to selectively port hydraulic fluid under pressure to the opposite ends of chamber 41 so as to bring about desired movement of piston 28, and this valve may be of the type manufactured by the Moog Valve Manufacturing Company of East Aurora, New York, such as their valve model 568. This valve is equipped with four ports for the flow of hydraulic fluid, which are arranged to coincide with similarly spaced ports created in the rear face of upper cylinder housing 38, to which face the servo valve 27 is affixed. Hydraulic fluid at, say, 1500 per sq. in. pressure is conducted such as by flexible line or hose 117 into junction block 118, also mounted on the rear face of housing 38, and a similar hose 119 forms the return for hydraulic fluid that has already passed through the unit. The ports connected to lines 117 and 119 lead through appropriate passages created in housing 38 to two of the aforementioned ports of the servo valve, whereas passages 121 and 122, observable in FIGURE 2, allow high pressure fluid to be selectively applied by valve 27 to either end of cylinder 41, while concomitantly releasing the fluid trapped in the opposite end of the cylinder.

In a manner discussed in greater detail hereinafter, upon the stylus unit being moved by the master pattern so as to call, for example, for a forward motion of yoke 45, the appropriate winding of servo valve 27 is energized, allowing high pressure fluid to enter through passage 122 into contact with the rod side of piston 28, and at the same time allowing fluid to be returned through passage 121 through the opposite end of cylinder 41. The motion of yoke 45 as a result of movement of piston 28 in the forward direction is away from an operator standing in front of the machine, or to the left as viewed in FIGURE 2. This motion of yoke 45 causes dog 53 to pivot forwardly, or clockwise as shown in FIGURE 1 so as to push the core of transducer 36 inwardly. Because transducer 36 is in series-bucking relationship with transducer 35 of the stylus unit, an error signal sent by transducer 35 is gradually compensated for and ultimately cancelled out when head 10 has been tilted sufficiently forward that the signal from transducer 36 equals the error signal.

In a similar manner, servo valve 27a is mounted on the lower cylinder housing 38a to function in an identical manner as servo valve 27, but of course in this instance serving to cause left and right arcuate motion of the head 10. The windings of servo valve 27a are connected into amplifier unit 18 so as to be energized in accordance with signals from the transducers of the left-right circuitry.

In a like manner to that described hereinbefore with regard to fore-aft movement of the head, a junction block 118a is provided as seen in FIGURE 1 on lower cylinder housing 38a for receiving hydraulic fluid under pressure for use by the lower head mechanism. Similarly, dog 53a and accompanying linkage is provided on lower arcuate member 21a so as to supply transducer 36a with left-right feedback information.

Tracer Unit

Tracer unit 14, or stylus unit as it may hereafter be called, is adapted to be received in the tracer unit of any of a number of pattern controlled milling machines on the market, so that it can be employed for controlling the contouring movements of the head. To that end, an upstanding attachment fitting 77 is provided on the upper surface of housing 32 of the tracer mechanism, so that the unit 14 may be secured in a desired manner in the tracer unit 154 of parent machine. Note FIGURES 1 and 4.

Housing 32 of tracer mechanism 14 has a plurality of styli 22 through 25 slideably disposed in guided, essentially parallel relation therein, and a fixed stylus 26 centrally disposed on the bottom of said housing. Styli 22—25 are respectively movable in a manner now to be described, being arranged to closely follow the contours of master pattern 17. These movements are to be converted into electrical signals by motion sensitive means such as transducers, which signals are amplified by amplifier 18 and then applied to servo valves 27 and 27a to bring about movements of head 10 in the fore and aft, and the left and right directions, respectively, whereby the cutter 15 will be enabled to be disposed so as to contour the workpiece into exact conformance with a master pattern.

A first pair of movable styli 22 and 23 are disposed at two diagonally opposite points in housing 32, and a second pair of styli 24 and 25 are located at the other diagonally opposite corners so as to obtain fore-aft, and left-right information, respectively. Appropriate fittings 79 are provided at the bottom of each stylus, which may utilize a carbide ball 80 so that the contours of the pattern 17 to be used with the unit may be closely followed, with minimum likelihood of wear.

The upper ends of the styli are pivotally attached to respective pivotal members or trunnion arms, with styli 22 and 23 pivotally secured to opposite ends of trunnion arm 33, and styli 24 and 25 pivotally secured to opposite ends of trunnion arm 33a so that when one stylus of a pair is moved upwardly by the pattern, the other stylus of that pair is moved downwardly, and vice versa. The styli may each have short, transverse mounting pins 132 thereon, adapted to be received in slots 133 on the trunnions and held in position by appropriate set screws.

Trunnion arms 33 and 33a thus form the supports for the respective pairs of styli, with these arms being in turn supported from a ball bearing, advantageously utilized in the center location of each trunnion arm; note bearing 134 in trunnion 33. Pins 123 and 123a are illustrated fitting into the inside diameters of their respective bearings to directly support the trunnion arms, and these pins are firmly fixed in the housing 32, such as by force fit into appropriate drilled holes, such as hole 135. The arrangement of the stylus unit is such that throughout the guided motions of the styli, the trunnion arms 33 and 33a may be moved without interference with each other. Furthermore, the lower, or active surfaces of the styli are maintained in a common plane at all times. That is to say, despite the fact that neither pair, one pair, or both pairs of styli are in deflected position, the carbide balls 80 will always be simultaneously contacted if a small flat plate is held thereunder.

Figure 4:
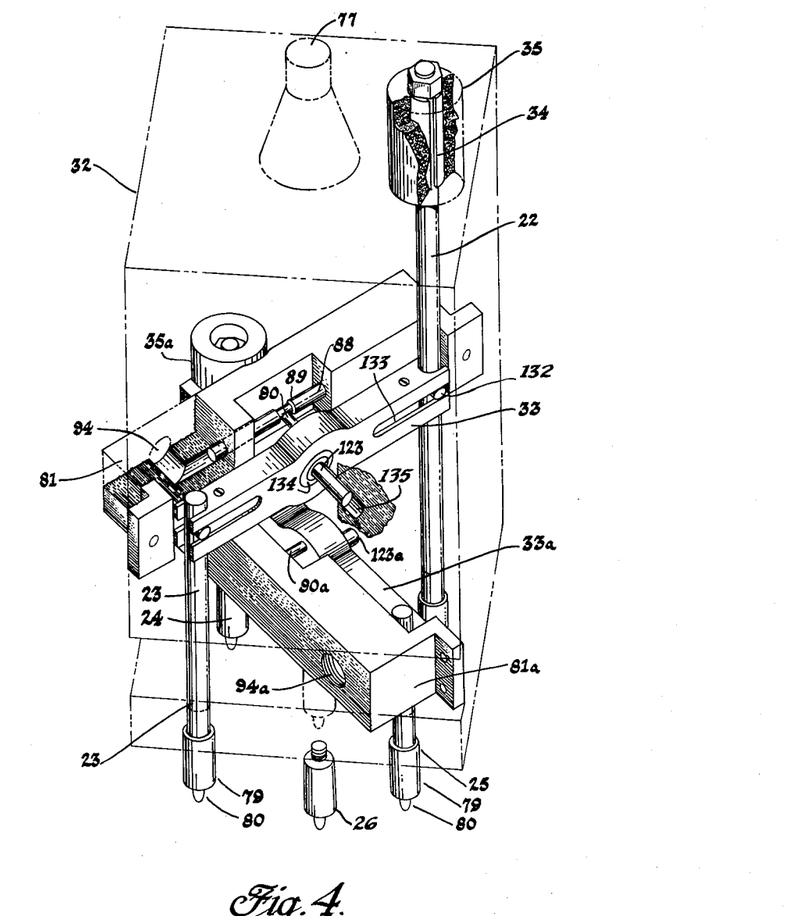
FIGURE 4 is a perspective view of the stylus unit in enlarged detail, with portions of the housing removed to reveal internal construction.

According to the present arrangement, the motions of the styli or unit 14 are transmitted to the rest of the system by the use of differential transformers, herein referred to as transducers. Up and down motions of styli 22 and 23 are electrically sensed by transducer 35, which as shown in FIGURE 4, is mounted substantially in alignment with stylus 22. Stylus 22 has an upper extension that is directly fastened to the movable core 34 of transducer 35, so that this transducer can observe all relative motion of stylus pair 22, 23. In a similar manner, transducer 35a is utilized to electrically sense the motions of stylus pair 24, 25, the core of this transducer being mounted upon an upper extension of stylus 24. The electrical connection of these two transducers to the other components of the system is provided by harness 136 that connects to housing 32, as revealed in FIGURE 1.

The four relatively movable styli 22 through 25 would be capable of accurately bringing about the proper positioning of movable head 10 as a result of their deflections if only female or concave contours were to be followed. However, this invention is cognizant of the fact that it must be desired to follow male contours, as well as compound contours involving the combination of male and female contours. To that end, a center stylus 26 is provided, mounted in a centrally located position on the bottom of housing 32 such as by being screw threaded therein. This places the active surface of stylus 26 at the intersection point of two imaginary lines interconnecting the active surfaces of each stylus pair. As will be described hereinafter, when male contours are to be followed, the fixed stylus 26 follows the pattern, with one stylus of each styli pair being biased or preloaded such as by air pressure into a position in which they contact with several ounces of pressure the pattern to be followed.

In order that the styli pairs can be preloaded in a desired manner, provision is made in the embodiment of the stylus unit illustrated in FIGURE 4 for pressurized fluid, such as pneumatic pressure to be used for that purpose. Upper and lower piston housings 81 and 81a are arranged to be received in appropriate slots cut into the sides of housing 32, with the ends of these housings being secured such as by screws, directly to diagonally opposite corners of housing 32 so as to be rigidly disposed thereon. Note FIGURE 8. The piston housings are disposed at substantially 90° to each other, and are each equipped with a piston and cylinder arrangement whereby pneumatic pressure may be applied to the outer ends of the respective piston members by means of pneumatic pressure applied through ports at the ends of each housing. Piston member 88 is slidable in sealed relation in a cylinder disposed generally along the longitudinal axis of piston housing 81, and has a groove 89 cut around its central portion to receive pin 90, affixed to trunnion arm 33. Pin 90 and pin 90a are fixed in eccentric relation upon their respective trunnion arms, and are so placed with regard to the piston member of the respective piston housings that motions of a piston member will be conveyed to the respective trunnion arm to cause tilting thereof. The pins 90 and 90a are disposed approximately ½ inch off center with respect to support pins 123 and 123a of the trunnion arms, so the movement of a piston member can bring about, as a result of the pin and groove arrangement, a desirable attitude or position of the respective trunnion arm.

For example, if pressure is applied to port 94 on the left side of housing 81 as seen in FIGURE 4, piston member 88 is biased to the right, which causes groove 89 to push to the right so as to cause eccentrically mounted pin 90 in trunnion arm 33 to pivot about its support pin in a clockwise direction as viewed in FIGURE 4, and thereby bias stylus 22 downwardly. Pressure applied to the opposite end of piston housing 81 will of course result in the oposite end member of that stylus pair, stylus 23, being biased downwardly.

As a result of the preloading of a stylus pair, the leading pin in the direction of a cut can be caused to contact the pattern with several ounces of pressure at all times when a male or convex contour is being followed. This allows one or both trunnion arms to reside in tilted positions, and therefore the head to tilt correspondingly. This tilt of the head is of course an important facet of this invention, for the tool or cutter of head 10 always addresses the workpiece at the correct angle so as to avoid crushing of a workpiece of comparatively lightweight or insubstantial construction, which of course would result in the destruction of the contours thereof. An example of such a workpiece might be foamed plastic or plaster. In the event the contour is compound, i.e., curvature in fore and aft, and left and right directions, both trunnion arms 33 and 33a will be tilted to bring about proper angularity of the cutter.

Figure 5:
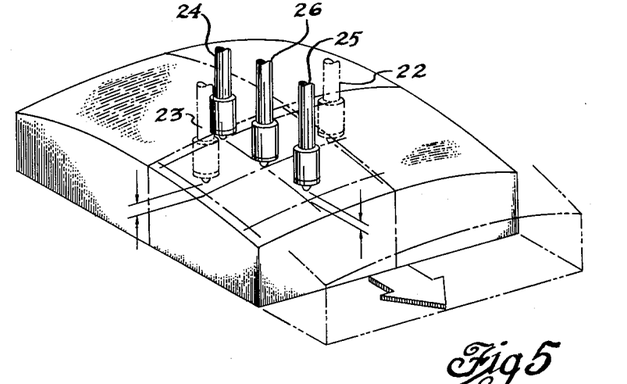
FIGURE 5 is a simplified view showing in detail the relationship of stylus pins of the relatively fixed tracer unit to a convex pattern moving thereunder in the direction of the large arrow.

The stylus arrangement may be clearly seen in FIGURE 5, wherein the stylus pins may be considered as being relatively fixed in the horizontal plane, with the convex-shaped master pattern and the table 13 proceeding in the direction of the large arrow with respect thereto, or in other words, from the operator's left to his right, as viewed from the front of the machine of FIGURE 1. In this instance, stylus 24 is properly regardable as being the leading stylus insofar as left to right motion is concerned, and since fixed stylus 26 is also contacting the pattern, stylus 25, the opposite interconnected pair member, clears the model, as shown in this figure. Because the tips of styli 24, 25 and 26 are always in a common plane, and the pattern's contours are convex in the left-right and fore-aft direction, the trailing stylus pin, pin 25 in this instance, cannot contact the pattern unless a flat spot is encountered therein during this left to right motion.

As shown in this figure, three styli should be in contact with the pattern at all times in order to insure the issuance of proper commands to the head. Therefore, stylus 22 of the fore and aft stylus pair is also in contact with the pattern to assure the proper simultaneous angularity of the cutter in the fore and aft sense.

As should be understood, head 10 assumes a tilt in response to the positioning of the stylus pairs, so when stylus pair 24 and 25 are in the position shown in FIGURE 5, the forward edge of the cutter blade is raised somewhat with respect to the horizontal, but with of course the front edge of the cutter remaining in contact with the workpiece (not shown in this figure) as the cutter travels up the workpiece toward the crest thereof. This angle assumed by the cutter blade with respect to the workpiece is of course occasioned by the stylus pin 24 having been pushed upwardly by the pattern as a result of the convexity of the contour. Then, as the table proceeds further in the direction of the large arrow, the pin 24 will reach the highest point of the pattern and then commence to descend on the other side thereof, with the cutter angle conforming to the pattern contour at all times. Therefore, by the time the stylus 24 has reached the far side of the pattern, it will be lower than the center stylus, which is still at a higher location on the pattern. This means that the leading edge of the cutter blade will have a definite downward tilt. If no flat spot was encountered on the pattern and the pattern remained convex, the stylus pin 25 will remain spaced from the pattern at all times during this left to right movement of the pattern. However, if the pattern had had a concave portion, both pins 24 and 25, or possibly all four movable styli would have come into contact with the pattern.

The stylus unit is capable of generating accurate information for controlling the tilt of head 10 despite the fact that the contour may change from convex to concave or vice versa. This is to say, the preloading of the two "leading" pins (24 and 22 in FIGURE 5) so as to give proper tilt to the cutter and to cause their respective pair members to clear a convex surface does not prevent all four movable styli from properly following a concavity, should one be encountered during movement across the pattern. This is because the preloading or biasing of the styli is in ounces of pressure; any greater pressure might be sufficient to upset the operation of the rise and fall mechanism of the parent machine, i.e., too much bias on the styli might have the effect of pushing stylus 26 away from the pattern. When the bias pressure is proper, however, the stylus arrangement according to this invention is quite satisfactory for transmitting rise and fall information to the parent machine.

Upon the edge of the pattern having been reached, it is necessary that the table of the machine be redirected so that the next succeeding cut can be taken. Therefore, several things must take place before this can be done. Firstly, the table must be stopped, which is typically accomplished automatically by the use of stops on the machine. Next, the table must be indexed toward the operator (or the ram of the head moved forward, depending on the type of parent machine) so as to move the pattern and workpiece with respect to the styli and cutter head, respectively, preparatory to the next cut to be taken. This also may be accomplished automatically on some machines. Furthermore, the head must be tilted oppositely so as to approach the workpiece at the proper angle in order to prevent damage to the workpiece.

The proper positioning of the head is of course determined by the positioning of the styli of unit 14, and it is therefore necessary in this instance that stylus pin 25 (rather than stylus pin 24) be biased into close contact with the pattern as table movement commences in the opposite direction. As will be seen from comparing FIGURE 6 with FIGURE 5, pin 22 remains the "leading" pin, and remains biased in contact with the pattern.

The biasing of pin 25 into contact with the pattern is automatically accomplished according to this invention by the use of a four-way valve 19 positioned on the bed of the machine as seen in FIGURE 1. This four-way valve may be an air valve of the type manufactured by Mead Specialties Company, 4116 N. Knox Avenue, Chicago 41, Ill. Mead valve No. 402 has been found to be admirably suited for the purpose of shifting the direction of the pneumatic pressure bias upon the stylus pins, dependent upon the direction of movement of the table of the machine. This type of valve is connected to a source of pneumatic pressure, such as "shop" air, by the use of hose 137. Depending upon the direction of its actuation, valve unit 19 will port the shop air via fluid line 141 or 142 to the proper end of the left-right piston housing 81a of the stylus unit, hereinbefore described. This is accomplished by virtue of the provision of two small fluid lines 138 and 139 on the valve, each of which has a pressure sensitive tip thereon, in the nature of a ball bearing biased to close a small orifice. Upon one of these tips being touched, this allows air pressure in that line to escape and thereby allow the valving member (not shown) in valve unit 19 to move so as to admit high pressure air through 141 or 142 to the proper end of piston housing 81a of the stylus unit. This of course brings about a tilt of trunnion member 33a. Then, when the table is reversed, the opposite pressure sensitive tip, which is connected to the opposite line is contacted, bringing about a movement of the valve member of valve 19 in the opposite direction so as to cause the trunnion member 33a of the stylus unit to be tilted in the opposite direction.

This actuation of the pressure sensitive tips of valve 19 is brought about by the use of a flexible wiper 140 mounted on valve 19, with one edge of wiper 140 arranged to rub against table 13 of the parent machine as the table moves along the bed of the machine. Therefore, as table 13 moves from left to right as viewed in FIGURE 1 this causes wiper 140 to be deformed to the right as shown in FIGURE 1, and thereby be biased into contact with the pressure sensitive tip of line 138. This has the effect of allowing the valving member of valve unit 19 to be biased so as to allow high pressure air to be directed to the end of piston housing 81a appropriate for bringing about the tilting of the trunnion 33a and the head such that the leading stylus is in contact with the pattern and workpiece 12 is contacted by the leading edge of the cutter. As should be obvious, when the table is moved in the opposite direction, a corresponding opposite tilt of trunnion 33a and the head is brought about.

Figure 6:
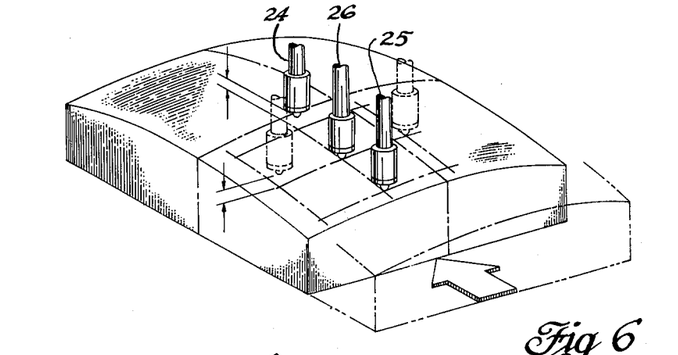
FIGURE 6 is a view closely resembling FIGURE 5, but with the pattern indexed to a new position, and traveling in the opposite direction.

As shown in FIGURE 6, the direction of movement of table 13 has changed, the table has been indexed forward about one-half of a cutter diameter, and the pattern has proceeded from right to left as shown by the large arrow. Pin 25 must be in contact with the pattern, and pin 24 spaced therefrom as to be observed in this figure, and because of this the head 10 has been tilted appropriately, the leading edge of cutter 15 addresses the workpiece at the proper angle.

As to be observed in both FIGURES 5 and 6, inasmuch as the pattern is also convex in the fore and aft direction, the stylus pin 22 will be in contact with the pattern in both the right and left directions of cut, as previously mentioned, with stylus pin 23 spaced from the pattern as shown in these figures. This is the desirable arrangement inasmuch as the cutter must, in addition to being tilted appropriately for cuts in the left and right direction, also be tilted so as to observe the proper angle with regard to the fore and aft direction.

Tilt of the head in the fore-aft direction is accomplished by virtue of the provision of a four-way valve corresponding to valve unit 19, arranged to note fore-aft table movements, and to port high pressure fluid to the appropriate end of piston housing 81 via lines 143 and 144. If, however, the table is not movable in the fore and aft direction, but rather the head is mounted upon a movable ram, the four-way valve (not shown) associated with fore and aft movement could of course be mounted so that its wiper could observe the fore and aft movement of the ram and thus being about the proper biasing of the fore and aft styli pair 22 and 23.

It is not to be assumed from the foregoing that this invention is limited to principal movements in the left and right directions, and mere indexing movements in the fore and aft direction for the taking of succeeding cuts. As a matter of fact it may be desirable in some instances to move the workpiece under the cutter in a circular, or a square manner. As an example, the motion might be right to left, then fore to aft, left to right, and then aft to fore so as to bring the cutter back to a point near the starting point, preparatory to the taking of the next four cuts about now smaller (or larger) dimensions.

For best results it has been found that the work should be indexed no more than an amount corresponding to ⅓ to ½ diameter of the cutter tool. Otherwise, if core material is being contoured, it will tend to be torn as a result of a tendency of removed strips to wrap around the shank of the cutter.

Figure 7:
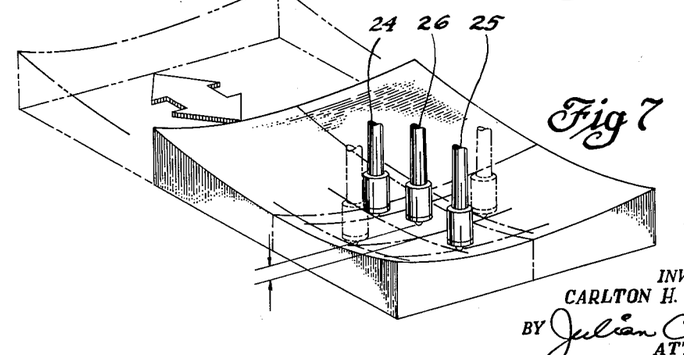
FIGURE 7 differs from FIGURES 5 and 6 in that it represents the relationship of styli to a concave contour.

Turning now to FIGURE 7, a concave contour is involved, and as indicated hereinbefore, fixed center stylus 26 does not contact the pattern. The four movable styli are adequate to bring about the proper angularity of the cutter with respect to the workpiece during all phases of the cut, regardless of direction of cut. If the workpiece is of honeycomb core, the amount of indexing of the work at the end of each cut should not exceed ½ the diameter of the cutter, to prevent tearing the core. If the workpiece however is of such a material that it would tend to crumble, e.g., plaster, foam plaster or the like, the feed may then be increased up to virtually the entire diameter of the cutter.

(The latter is not possible on cuts of convex contour even though material that tends to crumble is involved, because if the feed is too great, objectable flats are created as a result of a small increment of material left uncut.)

Figure 8:
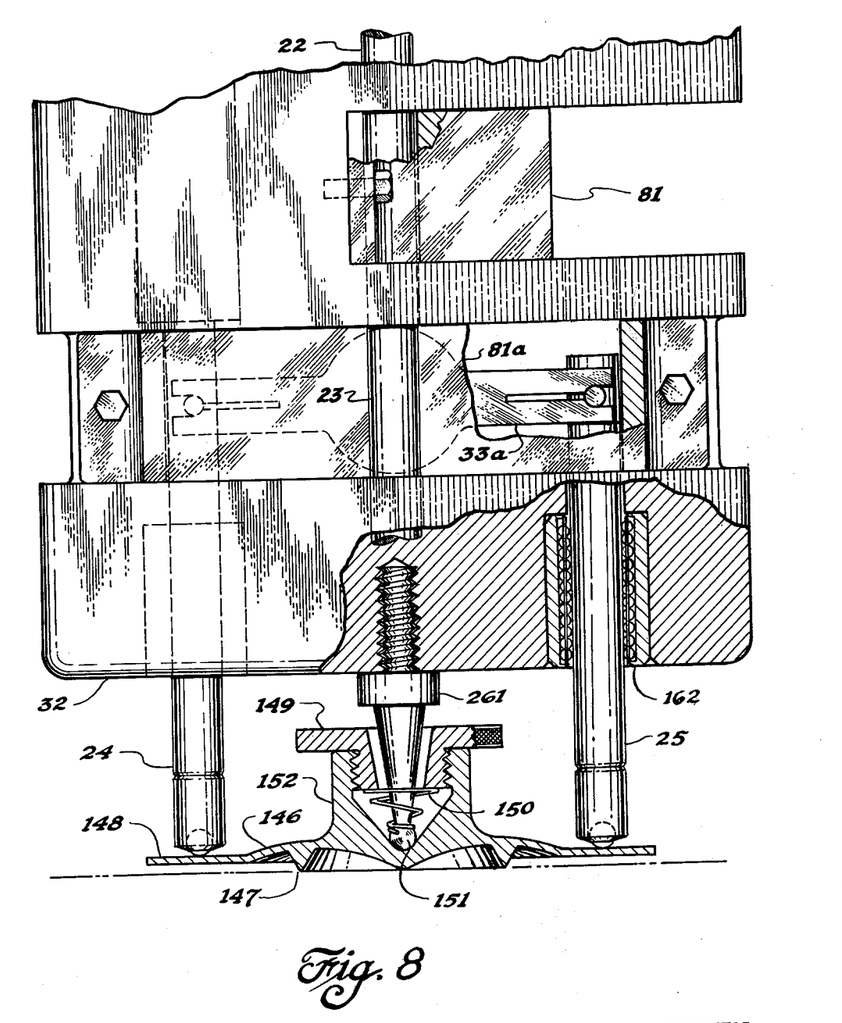
FIGURE 8 is an enlarged view of the lower portion of the stylus unit, with portions broken away to reveal internal construction.

It should be noted that the diameter of the cutter and the placement of the movable styli of the tracer unit should closely coincide, because otherwise the signals sent to the head by the stylus unit would not be such as to position the cutter in the right attitude to the work. If for some reason it is necessary to use a smaller or larger cutter, the tracer unit of the machine may be changed so as to utilize a unit having the movable pins spaced at distances corresponding to diameter of the cutter. One alternative to this is to have the pins 22—25 of the unit adjustable outwardly or inwardly. This of course is easily accomplished because trunnion bars 33 and 33a are slotted along a substantial portion of their length to permit alteration of the position of styli therein. Another alternative to this is to employ a removable disc 146 on the underside of stylus unit 14. Disc 146, as seen in FIGURE 8 is equipped with a pattern-contacting portion 147 on the underside thereof, which in this instance is located upon a diameter less than the diametral spacing of the stylus pins, thereby enabling it to be used in conjunction with a cutter of a diameter less than the distance between diagonally opposite styli, if such a cutter be required. The upper peripheral edge of disc 146 forms in effect a shelf 148 against which the active surfaces of the styli may bear, this shelf thereby serving to convey deflections in pattern contour, encountered by portion 147, directly to the styli.

Disc 146 is removably attached in a rapid manner to the lower portion of unit 14 by utilizing a fixed stylus 261 having a knurled thumb nut 149. This thumb nut is retained thereon by a helical spring 150, the smaller end of which fits closely against rounded end 151 of the fixed stylus pin. The threads of nut 149 are arranged to engage the threads of internally threaded boss 152 in the center of disc 146, and by the tightening of this nut 149, the disc is drawn into contact with the active portions of the styli. The rounded end 151 of pin 261 is drawn into contact with the lower inner surface of boss 152, so that disc 146 is free to tilt about pin 261 so as to bring about deflection of the movable stylus pins in much the same manner as would be brought about had disc 146 not been used. Disc 146 is of course easily applied to or removed from stylus unit 14 by rotation of nut 149.

By having a disc corresponding to each size cutter to be used in the head, it is possible to easily adapt a single stylus unit to direct proper signals to the head for assuring correct cutter angle. As should be apparent, the disc 146 of the type shown in FIGURE 8 results in even more accurate stylus indications, inasmuch as the radius of the pattern contacting portion 147 is less than the radius of shelf 148, and a magnification of the deflections encountered takes place. However, the disc may be of a configuration in which the pattern-contacting portion thereof is at a greater radius than the radius of shelf 148, which enables a cutter of greater radius to be used.

Although member 146 may instead of a disc be an X-shaped member pivotal about pin 261, and having four individual "feet" instead of a ring-shaped pattern contacting portion 147, the disc configuration is preferred inasmuch as less undesired deflections of member 146 occur.

When an end mill is being employed as the cutter, and ordinary contouring movements are involved, the spacer of the stylus pins should agree with the diameter of the cutter in order that it will always be at the proper angle with regard to the workpiece. When swarfing operations are being performed, however, the milling cutter is not tilted about its center point, but rather about a point on the intersection of the outside diameter and the end of the mill, and correlation between stylus spacing and cutter diameter need not exist. As hereinbefore described at length, by moving the lower housing 38a along pins or bars 440 with respect to the upper housing 38 so as to create an offset focal point, the present head is easily adapted for swarfing operations. In such an instance, it may be desirable to turn unit 14 at right angles to the position shown in FIGURE 1, so as to mount it in a substantially horizontal direction. In this instance, the stylus pins can be moved along a vertical edge so as to pick up angles off the vertical. To that end, shank 77 is arranged to be easily removed from housing 32, such as being unscrewed therefrom, and provision is made on one or more sides of housing 32 that the shank may be reinstalled thereon for providing a suitable mounting in the horizontal position. Furthermore, the entire head unit 10 may be rotated 90° to the horizontal position if contouring or swarfing on a vertically disposed surface is involved.

As shown in FIGURE 8, the lower ends of the movable stylus pins are slidably disposed in the lower part of housing 32, such as in bearings 162. These bearings may be Ball Bushings, such as manufactured by Thomson Industries, Inc. of Manhasset, New York. In the event the distance between styli is to be adjustable, so that a given stylus unit can be used with a variety of different diameter cutters, an arrangement must of course be made for the lower stylus bearings to be adjustably positionable in the bottom of housing 32. For example, holes can be provided at different locations in the bottom of the housing 32, and the styli and their respective bearings inserted in the holes corresponding to the diameter of the cutter to be used. The styli must be kept substantially parallel, so the adjustment of the position of the styli in their respective trunnions must agree with the spacing of the bearings 162.

*Amplifier-Demodulator*

Figure 9:
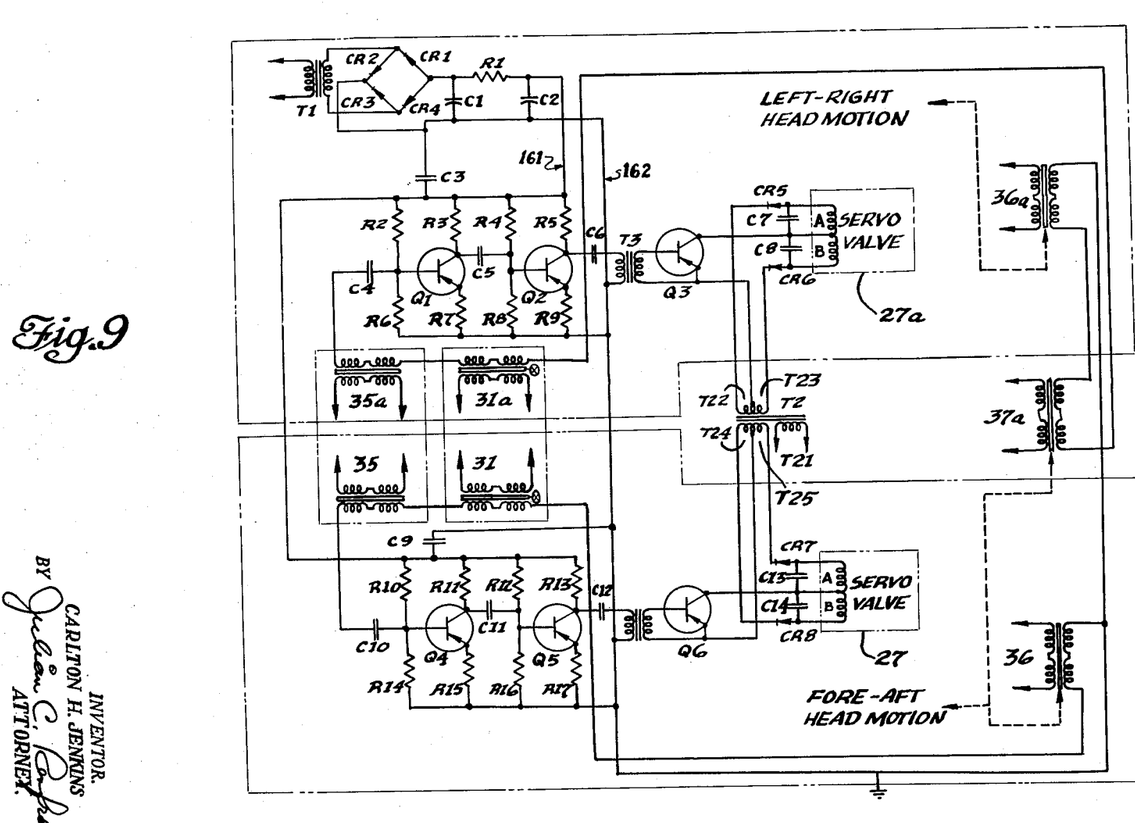
FIGURE 9 is a circuit diagram representing the amplifier-demodulator units for the fore and aft, and right and left channels of the system, this view also revealing the relationships of the various transducers of the head and stylus units.

The electrical circuitry associated with amplifier 18 and the seven transducers are represented by the circuit diagram of FIGURE 9. Generally speaking, the upper section of the circuit shown in this FIGURE is associated with left-right movements of the head, and the lower section is associated with fore-aft movements. The left-right section may be subdivided into the amplifier portion, utilizing transistors Q1 and Q2 in cascade, and the phase detector or demodulator portion, utilizing transistor Q3, whereas the fore-aft section may be subdivided into the amplifier portion, utilizing transistors Q4 and Q5 in cascade, and the phase detector portion, utilizing transistor Q6. Although a vacuum tube arrangement might well have been used, I found it preferable to employ the transistorized arrangement shown herein. As an example, 2N527 PNP transistors may be advantageously utilized. As previously mentioned, the transducers referred to in this description are preferably differential transformers whose cores are adapted to be moved mechanically in and out to vary the coupling thereof. Differential transformers class 6208 manufactured by the Automatic Temperature Control Company of Philadelphia, Pennsylvania were found to be easily adapted to perform the transducer operation of FIGURE 9.

Transducers 31a, 35a, 36a and 37a are associated with left-right movement of the head, and the error signal therefrom is applied to the base of transistor Q1 through capacitor C4. The amplified output of Q1 is then coupled by C5 into the base of Q2. The amplified output of Q2 is supplied to the primary of transformer T3 via blocking-capacitor C6.

One side of the secondary of transformer T3 is interconnected with the center tap of one secondary winding of reference transformer T2 and the emitter of Q3, whereas the other side of the secondary of transformer T3 is directly connected to the base of Q3.

The collector-emitter junction of transistor Q3 is connected in series between the common junction of differential control windings A and B of servo valve 27a, and the center tap between windings T22 and T23 of transformer T2. Transformer T2 therefore serves to supply a reference phase to both the left-right windings T22 and T23, as well as to fore-aft windings T24 and T25. The primary winding T21 of this transformer is energized by 115 volts, 60 cycle power.

Diodes CR5 and CR6 are interposed between the ends of secondaries T22 and T23 and the series windings A—B of 27a, these diodes allowing only negative pulses to be cyclically applied to either winding A or winding B. Being connected between the center tap between windings T22 and T23 and the common junction of windings A and B, transistor Q3 acts as a gate and, depending upon the phase of the signal applied to the base of Q3, will allow current to flow through either winding A or winding B of the servo valve, as will appear in greater detail hereinafter.

Low voltage D.C. power is obtained by the use of transformer T1, which steps down 115 volts, 60 cycle at the primary to 12 volts at the secondary, and a full-wave rectifier comprising diodes CR1, CR2, CR3, and CR4. The diodes rectify the 12 volts A.C. to 12 volts D.C. which is then filtered by capacitors C1 and C2 and resistor R1. Power line 160 is utilized to supply power to transistors Q1, Q2, Q4 and Q5 as is illustrated in the drawing. Ground lead 161 supplies a common ground for the transistors and the transducers. A bias stabilization network for transistor Q1 is provided by resistors R2 and R6, and resistors R4 and R8 provide the same function for Q2. Resistors R7 and R9 provide degenerative current feedback and resistors R3 and R5 are the load resistors for Q1 and Q2 respectively. Resistors R10 through R17 of the fore-aft section respectively correspond in function to resistors R2 through R9 of the left-right section.

The primaries of left-right transducers 31a, 35a, 36a, and 37a are energized by 3.15 volts A.C., while the secondaries of these transducers are connected in series. Transducer 35a associated with stylus unit 14 is arranged to sense motion of the left-right stylus pair 24 and 25, whereas transducer 36a on the head is arranged to supply a feedback signal, dependent upon the position of the head at any instant. Transducer 31a associated with the micro-positioner unit for expediting the setup of the head, operates in a manner similar to transducer 35a except the core of 31a is manually moved to effect changes in primary-to-secondary coupling. Transducer 37a, associated with the compound contouring feature of this invention, is arranged to provide overtravel in the left-right direction depending upon the degree of fore-aft tilt of the head.

It should be noted that transducer 36a is connected in opposed phase relation with the other transducers of this channel, so that instead of an error being amplified, correction of the error will be provided in the well known manner of a servo loop.

Turning now to a study of the phase detector portion of this device, the circuitry between the secondary of transformer T3 and the windings of servo valve 27a is such that current tends to flow through diode CR5, winding A, transistor Q3, and winding T22 on one-half cycle of the incoming signal, and through diode CR6, winding B, transistor Q3 and winding T23 on the other half cycle, with transistor Q3 acting as a switch for controlling the current flow through one winding or the other of servo valve 27a in a manner to be described.

Because the secondary winding of transformer T3 is connected between the base and emitter of transistor Q3, it can control the resistance of the collector-emitter path of Q3. Therefore, as current is flowing through the transistor from base to emitter, such as occurs in this PNP transistor on the negative half cycle, this brings about a very low resistance between collector and emitter of Q3, which can be likened to the completing of a current path through a switch. When, however, current flows through the transistor from emitter to base, which would tend to occur on the positive half cycle, a high resistance exists between collector and emitter, which can be likened to the breaking of a circuit path through a switch. Therefore, depending whether the phase of the voltage on winding T22 or T23 is in coincidence with the phase of the incoming signal to the transistor when the resistance of Q3 is low, one or the other of the servo valve windings can be energized to bring about movement of the right and left piston of the head 10 in a desired direction.

As is well known, when winding T22 of reference transformer T2 is positive, winding T23 is negative and vice versa. Therefore, if the left hand side of winding T22 is negative with respect to the center tap at the same time that the signal to the base of transistor Q3 is negative, current can flow because of the conducting state that transistor Q3 is in, but only through winding A of servo valve 27A, for CR5 permits flow in this direction, whereas diode CR6 prevents flow through winding B.

If, however, the phase of winding T23 is negative at the time the base of Q3 is negative, the current will flow through winding B, for diode CR6 allows this, but diode CR5 of course blocks flow through winding A. Thus it is to be seen that either winding A or winding B of servo valve 27a is continuously energized so long as an incoming signal to the base of transistor Q3 is present.

Since transformer T2 serves merely as a reference, it is the phase of the voltage on the secondary of transformer T3 that determines whether winding A or winding B of servo valve 27a is energized, and this phase is in turn determined by the direction in which the armature of stylus transducers 35a is moved. Therefore, if the armature of transducer 35a is moved in a direction corresponding to a tilt to the left of trunnion 33a, this will result in a signal to the base of transducer Q3 that will result in the energizing of the winding of servo valve 27a that will bring about proportional arcuate movement of head 10 to the left.

The motion of the head to the left causes the core of transducer 36a to move, thereby changing the primary to secondary coupling thereof in such a manner that the induced secondary voltage of 36a will change in a vector-cancelling direction relative to the voltage induced in the secondary of transducer 35a. Eventually the transducer secondary voltages will again exactly balance so that no signal is introduced to the amplifier section of the circuit, consequently allowing motion of the left-right main piston to cease. Motion of the left-right stylus pair in an opposite direction of course brings about opposite motion of the head in a manner similar to that just described.

As should be apparent, the fore and aft section of the amplifier-demodulator operates in essentially the identical manner to the left and right section, with the secondaries of transducers 31, 35 and 36 being connected in series to serve the same type of function as their left-right counterparts.

Micropositioner Unit

As will be understood, it would ordinarily be quite difficult to set up the present machine for each new contouring job to be performed. This is because the styli are constructed and arranged to observe minute contours of a pattern being followed. Accordingly, it would be a painstaking job to position the stylus pins in a precise relationship with the pattern to be followed, and simultaneously position the cutter in the proper relationship to the workpiece to be cut. The procedure is simplified by the provision of two additional transducers in amplifier unit 18 so that the head and styli relationships can be adjusted freely over a wide range of positions so as to achieve the proper initial set-up. Transducer 31, which appears only in FIGURE 9, is provided in the electrical circuit of the fore and aft circuit, and the core of this transducer is adjustable by means of knob 231 appearing in FIGURE 1 on the front of amplifier unit 18. Similarly, micropositioner transducer 31a is interposed in the left and right transducer circuit, the core of which transducer is adjustable by knob 231a also on amplifier unit 18.

The first step in establishing the proper relationships is to put all four movable styli in a parallel plane with respect to the table of machine. Then the transducers can be positioned by knobs 231 and 231a until the head 10 is in a true vertical position. After the usual adjustment necessary on a pattern controlled machine, the contouring operation may be commenced.

Knobs 231 and 231a may be graduated into a large number of increments so that they can be adjusted to an exact position, representative of the linear travel of the cores of transducers 31 and 31a. For example, a micrometer type arrangement may be provided in which 100 turns of the knobs 231 and 231a represent one inch of travel of the transducer core, so by merely adjusting the knobs, the operator may quickly position the head into appropriate left and right, and fore and aft positions before commencing a contouring operation.

Operation

As previously indicated, this invention possesses great utility and versatility with regard to the compound contouring of lightweight structural materials, such as stainless steel honeycomb core as made according to the Wasilisin and Wernz Patent No. 2,780,716 entitled "Core Manufacture" and assigned to the assignee of the present invention. The present invention may be employed in any of a number of commercially available parent machines, or alternatively, it may represent the basic design for the construction of a machine designed for compound contouring.

By virtue of the stylus unit of the machine being arranged to closely follow the contours of a master pattern, despite the complexity of the pattern, this unit is able to issue precise signals to the tiltable head unit that will cause it to move about its arcuate mountings so that the cutter of the head unit can assume a proper cutting angle with respect to the workpiece, so that the workpiece will be contoured into exact conformance with the contours of the pattern. More particularly, motion-sensitive means such as transducers are employed in the stylus unit so that upon the styli thereof being relatively moved by the pattern in directions corresponding to fore and aft, and right and left, signals can be created, representative of motion to be undertaken by the head. These signals are amplified and a phase detection operation is performed thereon to evolve appropriate commands to servo valves associated with respective tiltable members of the head. The servo valves being so energized, high pressure fluid at say, 1500 p.s.i. to 2000 p.s.i. is allowed to manifest itself on head pistons to bring about movement of the head in a direction or combination of directions as demanded by the stylus unit. Although this invention has been described as employing compressed air for the operation of motor 16 used to drive cutter 15, this was merely exemplary, and if a hydraulic motor is used for this purpose, considerably more horsepower can be developed. Whether compressed air, hydraulic systems, or other means are employed, it is to be realized that such systems need not be highly controlled.

It should be noted that for convenience, only one channel representing one axis of movement was described in detail herein, but it should be realized that both the fore and aft, and right and left movements are substantially identical, employing substantially the same basic elements, and differ one from the other only in comparatively minor respects.

As to the cutting operation, either a disc type cutter as illustrated, or a number of commercially available milling machine cutters may be used for contouring operations. Furthermore, an Anocut electrolytic cutter may also be used in this unit, for the use of such a cutter does not affect the basic features of this invention. Such a cutter is manufactured by Anocut Engineering Company, 631 W Washington St., Chicago 6, Illinois. Also, the cutting operation is not to be restricted to the attitude shown, for the axes of both the stylus unit and the cutter can be swung 90° into positions in which they are disposed substantially in a horizontal plane, so that the cutter can contour essentially vertically disposed workpieces.

I claim:

1. A pattern-controlled machine tool having a pivotally mounted head adapted for three dimensional contouring of a workpiece in accordance with the contours of a pattern comprising a machine having a bed, a table movable upon said bed and arranged to support a workpiece and a pattern in spaced relation thereon, a head capable of universal movements mounted above said table, said head comprising a pair of arcuately-movable members disposed in closely adjacent relationship, substantially symmetrically upon a centerline through said head, said arcuately movable members being arranged to selectively tilt on either side of said centerline, in planes disposed substantially orthogonally to each other, said head also having a tool disposed on said centerline for contouring said workpiece, a tracer attachment on said machine for following the contours of said pattern and for supplying signals to said head to control the tilt of said arcuate members, said tracer attachment having at least three pickup points thereon for following the contours of said pattern, whereby as said table is moved to move said workpiece with respect to said tool, said pattern is moved with respect to said tracer attachment to bring about the generation of signals for accurately controlling the pivotal movements of said head.

2. A universally tiltable head unit adapted to be installed in an automatic machine tool arrangement, said unit comprising closely adjacent first and second head members disposed substantially symmetrically upon a centerline through said head unit, said first head member having mounting means disposed upon said centerline for supporting said unit, said first head member having a first arcuately movable member mounted thereon for arcuate movement with respect to a focal point located upon said centerline, a second head member supported from said first arcuately movable member and supporting thereon a second arcuately movable member mounted for tilting movement in a plane substantially orthogonal to the plane of movement of said first arcuately movable member, said second arcuately movable member being movable about said focal point, self-contained means for selectively bringing about tilting movements of said arcuately movable members, a unit supported from said second arcuately movable member in which a tool may be mounted, said unit being located upon said centerline, said focal point of said movable members being centered at said tool, whereby said tool can be moved by the tilting of said head members so as to address a workpiece at a desired angle, and a control unit for accurately controlling the tilting motions of said arcuately movable members by actuating said self-contained means in accordance with the contours of a desired configuration.

3. A universally tiltable head unit adapted to be installed in an automatic machine tool arrangement, said unit comprising closely adjacent first and second head members disposed substantially symmetrically upon a centerline through said head unit, said first head member having mounting means disposed upon said centerline for supporting said unit, said first head member having a first arcuately movable member mounted thereon for arcuate movement with respect to a focal point located upon said centerline, a second head member supported from said first arcuately movable member and supporting thereon a second arcuately movable member mounted for tilting movement in a plane substantially orthogonal to the plane of movement of said first arcuately movable member, said second arcuately movable member being movable about said focal point, a unit supported from said second arcuately movable member in which a tool may be mounted, said unit being located upon said centerline, said focal point of said movable members being centered at said tool, whereby said tool can be moved by the tilting of said head members so as to address a workpiece at a desired angle, and a control unit for accurately controlling the tilting motions of said head members in accordance with the contours of a desired configuration, said control unit including a tracer mechanism comprising a housing, a plurality of styli differentially movable in said housing and adapted to follow the contours of a pattern, said tracer mechanism being adapted to be received in the rise and fall tracer unit of said machine tool.

4. A pattern controlled arrangement for a machine tool adapted to compound contour a workpiece of comparatively lightweight construction with a rotatable cutter, comprising a head unit and a tracer unit, said head unit being equipped with self contained motion-controlling means for tilting said head in first and second mutually perpendicular directions so as to provide correct cutter angle during contouring movements, said tracer unit comprising a relatively fixed housing having first and second differentially movable stylus pairs mounted therein for movement with respect to said housing, each stylus having thereon an active surface for following the contours of a pattern representing the contour to be cut into a workpiece, said first differentially movable stylus pair being connected with said motion-controlling means for bringing about tilting movements of said head in said first direction, and said second differentially movable stylus pair being connected with said motion-controlling means for bringing about tilting movements of said head in said second direction, whereby said head will be tilted so that said cutter can contour a workpiece to precisely agree with the contours of said pattern.

5. In combination, a universally tiltable head for a machine tool, and a tracer mechanism for controlling the movement of said head, said head comprising a pair of arcuately movable members disposed in closely adjacent relationship substantially symmetrically upon a centerline through said head for movement in planes disposed substantially orthogonally to each other, a tool mounted upon said centerline on one of said movable members and movable therewith, each of said arcuately movable members being movable with regard to a common focal point located at said tool and upon said centerline, a relatively fixed housing in which a plurality of movable stylus pins are differentially movable for sensing the contours of a master pattern to be followed in the contouring of a workpiece by said tool, motion sensitive means associated with said pins for establishing first signals to said head dependent upon deflection of each of said pins, means on said head for selectively controlling the motion of said arcuately movable members in accordance with said first signals from said motion sensitive means, means on said head for sensing the angle of tilt of said tool, said angle of tilt sensing means being adapted to return second signals to be compared with said first signals so as to move said arcuately movable members until the tilt thereof corresponds to the extent of deflection of said pins.

6. A universally tiltable head for a machine tool adapted for the compound contouring of a workpiece, comprising a pair of arcuately movable members mounted in closely adjacent relationship substantially symmetrically about a centerline through said head, said arcuately movable members being mounted for tilting movements in planes disposed substantially orthogonally to each other, means mounting on said centerline a rotatable tool on one of said arcuately movable members, for rotative movement for the contouring of a workpiece, each of said arcuately movable members being movable with regard to a common focal point located at said tool, control means for controlling the tilting movement of each of said arcuately movable members so that the cutting edge of said tool will be caused to address the workpiece at the optimum angle for a contouring operation, and compound angle compensating means operatively connected with one of said arcuately movable members for correcting the tilt of said one member proportionately to the tilt of the other of said members, thereby to compensate for the error in tool angle that would otherwise occur due to the compounding of angles.

7. The head arrangement as defined in claim 6 in which said compound angle compensating means includes a tilt angle sensing means operatively connected with the control means of said arcuate member nearer said focal point, and arranged to sense the degree of tilt of the arcuate member more remote from said focal point, said angle sensing means providing an input to latter control means substantially proportional to the tilt of said arcuate member more remote from said focal point, whereby to provide a corrective tilting movement for said arcuate member nearer said focal point.

8. The head arrangement as defined in claim 6 in which a linkage is provided on said arcuate member more remote from said focal point, for supplying an indication of the tilt of said more remote arcuate member, a movable angle plate disposed in a plane substantially parallel to the plane of motion of said arcuate member nearer said focal point, and positioned by said linkage to and from positions of angularity with said plane, motion sensitive means disposed upon latter arcuate member and arranged to sense angularity of said angle plane, said motion sensitive means being disposed in the electrical circuit controlling the motion of said latter member, and arranged to supply an additional signal thereto, said additional signal calling for additional deflection of said latter arcuate member as a result of deflection of said angle plate representative of increased tilt of said arcuate means more remote from said focal point.

9. In combination, a universally tiltable head for a machine tool, a tracer mechanism for following the contours of a pattern for supplying information to said head to control the tilt thereof, and an amplifier-demodulator electrically intermediate said head and said tracer mechanism, said head comprising a pair of closely adjacent arcuately movable members mounted substantially symmetrically about a centerline through said head for movement in planes disposed substantially orthogonally to each other, a rotatable tool mounted on said centerline on one of said arcuately movable members, means for tilting each of said arcuately movable members about a common focal point located at said tool, electrical motion-sensitive means mounted on said head for supplying information as to the degree of tilt of said head, said tracer mechanism comprising two pair of differentialy movable styli, each stylus having an active surface thereon for following the contours of a workpiece, one pair of styli having a plane of movement corresponding to the plane of movement of one of said arcuately movable head members, and the other pair of styli being disposed in a plane corresponding to the plane of movement of the other of said arcuately movable members, electrical motion-sensitive means connected to supply information as to the deflection of said respective styli, the motion-sensitive means of said first arcuate member and said first stylus pair being electrically interconnected, and the motion sensitive means of said second arcuate member and said second stylus pair being electrically interconnected, means in said amplifier-demodulator unit to separately receive signals from the motion sensitive means associated with each styli pair, and arranged to amplify and demodulate such signals so as to send a proper command to said tilting means for bringing about the respective tilting of said arcuate members depending upon the contour of said pattern, said motion sensitive means on said arcuate members serving to supply a feedback signal to said amplifier-demodulator as a result of being electrically disposed in series-bucking relation, whereby said head members will be tilted proportionately to the deflection of said respective stylus pairs, whereby the cutter of said head will be disposed at the proper angle with respect to a workpiece for the compound contouring thereof.

10. The combination defined in claim 9 in which an additional motion sensitive means adapted to sense the degree of tilt of one of said arcuate members is disposed in the electrical circuit of the other of said arcuate members, for supplying an additional tilt thereto to compensate for the compounding of angles resulting from tilt in two right angle directions.

11. The combination as defined in claim 9 in which adjustment means are provided in the electrical circuits associated with said motion-sensitive means for facilitating the initial setup of the machine tool.

12. The combination as defined in claim 9 in which said amplifier-demodulator is transistorized, said transistorized amplifier-demodulator including a pair of demodulator portions, each of said demodulator portions being adapted to compare a reference phase with the phase of separately received signals from the respective motion sensitive means, and to generate an appropriate command therefrom.

13. A pattern-controlled machine tool as defined in claim 1 in which a motion-sensitive device disposed adjacent said table senses the direction of movement of said table, said motion sensitive device being connected to bring about the biasing of a pickup point of said tracer attachment into a close contact with said pattern, the particular pickup point biased being the pickup point first contacting said pattern as a result of table movement in a given direction.

14. A self-contained universally tiltable head unit adapted to be installed in an automatic machine tool arrangement, said unit having closely adjacent first and second head members disposed substantially symmetrically upon a centerline through said head unit, said first head member having mounting means disposed upon said centerline for supporting said unit, said first head member having a first arcuately movable member mounted thereon for arcuate movement with respect to a focal point located upon said centerline, fluid operated means in said first head member for bringing about movements of first arcuately movable member as a result of the selective application of fluid pressure to said fluid operated means, thereby to control the direction and extent of movement of said first arcuately movable member, a second head member supported from said first arcuately movable member and supporting thereon a second arcuately movable member mounted for tilting movement in a plan substantially orthogonal to the plane of movement of said first arcuately movable member, said second arcuately movable member being movable about said focal point, latter member being equipped with fluid operated means for selectively bringing about movements of said second arcuately movable member, a unit supported from latter arcuately movable member in which a tool may be mounted, said unit being located upon said centerline, with said focal point centered at said tool, whereby said tool can be moved by the tilting of said arcuately movable members so as to address a workpiece at a desired angle, and a control unit for accurately controlling the admission of fluid to the fluid operated means of said first and second arcuately movable members, whereby tilting motions of said arcuately movable members can be brought about in accordance with the contours of a desired configuration.

15. A self-contained universally tiltable head unit adapted to be installed in an automatic machine tool arrangement, said unit having closely adjacent first and second head members disposed substantially symmetrically upon a centerline through said head unit, said first head member having mounting means disposed upon said centerline for supporting said unit, said first head member having a first arcuately movable member mounted thereon for arcuate movement with respect to a focal point located upon said centerline, fluid operated means in said first head member for bringing about movements of first arcuately movable member as a result of the selective application of fluid pressure to said fluid operated means, thereby to control the direction and extent of movement of said first arcuately movable member, a second head member adjustably supported from said first arcuately movable member and supporting thereon a second arcuately movable member mounted for tilting movement in a plane substantially orthogonal to the plane of movement of said first arcuately movable member, said second arcuately movable member being movable about said focal point, latter member being equipped with fluid operated means for selectively bringing about movements of said second arcuately movable member, a unit supported from latter arcuately movable member in which a tool may be mounted, said unit being located upon said centerline, with said focal point centered at said tool, but being capable of being moved away from said centerline for swarfing operations by virtue of adjustments of the position at which said second head member is supported with respect to said first arcuately movable member, whereby said tool can be moved by the tilting of said arcuately movable members so as to address a workpiece at a desired angle.

References Cited in the file of this patent

UNITED STATES PATENTS

| | | |
|---|---|---|
| 2,424,031 | Heer | July 15, 1947 |
| 2,500,850 | Miller | Mar. 14, 1950 |
| 2,608,907 | Ivins et al. | Sept. 2, 1952 |
| 2,674,160 | Martellotti | Apr. 6, 1954 |
| 2,794,371 | Roehm | June 4, 1957 |
| 2,863,361 | Daugherty | Dec. 9, 1958 |
| 2,863,363 | Schmid | Dec. 9, 1958 |
| 2,870,687 | Roberts et al. | Jan. 27, 1959 |